July 23, 1946.  W. E. HUMPHREY  2,404,636
VULCANIZING MOLD AND METHOD OF OPERATION
Filed Jan. 21, 1943
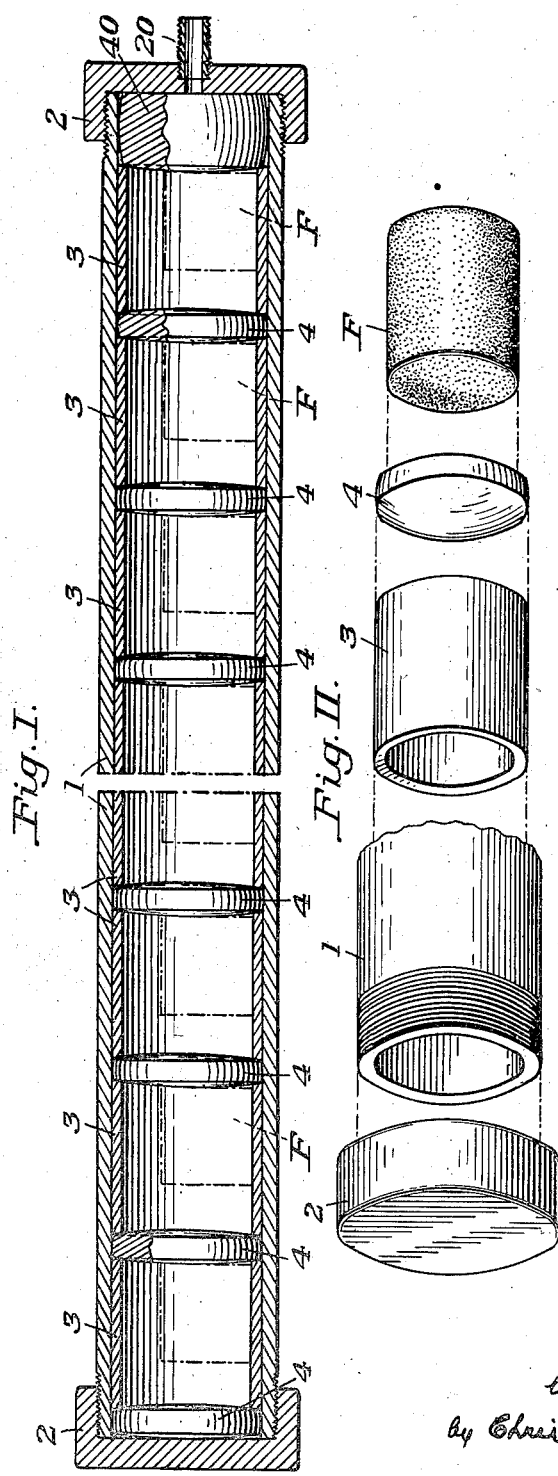
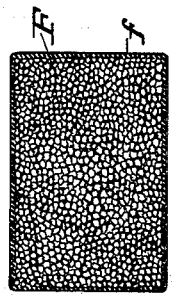
INVENTOR
Walter E. Humphrey
by Christy, Parmelee and Strickland
his attorneys Patented July 23, 1946

2,404,636

UNITED STATES PATENT OFFICE 2,404,636

VULCANIZING MOLD AND METHOD OF OPERATION

Walter E. Humphrey, Jeannette, Pa., assignor to Pennsylvania Rubber Company, Jeannette, Pa., a corporation of Pennsylvania Application January 21, 1943, Serial No. 473,045

2 Claims. (Cl. 18—53)

This invention relates to vulcanizing and a method of operation. It is typically applicable in the forming of molded articles of plastic material, and it finds practical application in the forming of molded articles of cellular rubber. Invention is found in method.

In the accompanying drawing Fig. I is a view in axial section of a mold for cylindrical articles of cellular rubber in the use of which the invention is practiced. The mold is composed of a plurality of parts, and in Fig. I the parts are shown in assembled position. Fig. II is a diagrammatic and fragmentary view in perspective of the mold parts separated one from another, and of an article vulcanized in the mold. Fig. III is a view in axial section of a mold part and of a cellular rubber article that has been vulcanized within it. This figure is illustrative of the method of releasing the article from the mold. Fig. IV is a view in axial section of the finished article after it has been released entirely from the mold.

Cellular rubber is rubber that contains, disseminated through and embedded in its substance, cells or pockets of gas. The cells are isolated; there is no communication between them; each body of gas is a bubble, enveloped in continuous and substantially impervious walls of rubber.

There are two well-recognized ways of imparting to a body of rubber such cellular structure. One is called the gassing method. According to this method the "biscuit" from which the article is formed, is brought, while in green (that is to say, in uncured) state, within a closed chamber, and there enveloped in a suitable gas (typically, nitrogen) under very heavy pressure. The compressed gas permeates the mass of green rubber, and forms, seemingly, minute pockets of gas strewn through the mass of plastic material. After a suitable length of time the article, still in the atmosphere of heavily compressed gas, is heated and vulcanized. When vulcanization has been effected, the pressure is relieved exteriorly; and then the pockets of gas strewn through the mass, now securely held, in consequence of the changed condition of the rubber, expand to produce the product desired. The other method is known as the blowing method. According to it, a blowing agent is incorporated in and distributed through the mass of green rubber. The article is shaped and is vulcanized while under restraint—ordinarily, within the confining walls of a mold cavity. The blowing agent is such that, inert at atmospheric temperature, it becomes active within the range of temperature that is realized in the vulcanizing operation, and produces a gas. The gas so produced is effective, while the article continues within the mold, and so far as the restraint of the mold permits, to form within the mass small, isolated bubbles. The gas that forms these bubbles is, thus far, highly compressed. When vulcanization has been completed (and, ordinarily, after the mold and its contents have been cooled again to atmospheric temperature), the mold is opened and the article released. The article then is unconfined; and the bubbles of gas within expand and bring the article to its desired condition. The invention is permissive of the practice of either of the methods that have been characterized. I have, however, found it advantageous to employ the second. Many blowing agents are known to the industry, among them diazoamino benzene. In the practice of the invention any preferred blowing agent may be employed. The use of diazoamino benzene may be preferred and is exemplary.

Among the widely various articles that may advantageously be formed of cellular rubber are floats, to afford buoyancy in aquatic installations, where buoyancy of high order and of long continued and unimpaired efficiency is desired. The invention will be described, applied to the production of a float. The finished float may typically be a cylindrical body 3 inches long and 2½ inches in diameter. A suitable mix for such an article may be as follows:

| | Parts |
|---|---|
| Smoked sheets (plasticized) | 50.17 |
| Whole tire reclaim | 100.00 |
| Sulfur | 3.00 |
| Zinc oxide | 2.60 |
| Agerite powder | 1.00 |
| Stearic acid | 12.00 |
| Pine tar oil | 5.00 |
| Paraffin | 10.00 |
| Brown substitute | 20.00 |
| Unicel (diazoamino benzene) | 28.00 |
| Total | 231.77 |

The composition is milled to uniformity, and is extruded in the form of a continuous cylindrical rod 1½ inches in diameter. The rod is sheared to lengths of approximately 2 inches. Such sheared lengths of the continuously formed stock may, without change, constitute the blanks or biscuits that are introduced into the vulcanizing mold; or, after shearing, each length severally may be enveloped in uncured sheet rubber that has been compounded without any blowing agent.

The blank, formed with or without such an envelope, is then enclosed in the chamber of the vulcanizing mold. The mold chamber will ordinarily be (though not necessarily) larger than the enclosed blank. As I preferably proceed, the space in the mold is approximately twice the volume of the blank of green rubber that is enclosed within it. Vulcanization follows. By the heat of vulcanization both the blowing agent and the rubber are changed. The change in the blowing agent effects the release, within the mass, of gas—restrained, however, from full expansion, so long as the article continues in the mold. The change in the rubber is manifest in the development of qualities of toughness, coherence, elasticity, and resilience that suit it, as green rubber is not suited, to be blown by the full development of cells within it to cellular rubber. When vulcanization has been completed, the mold and the article within it are ordinarily brought first to room temperature, and then the mold is opened and the article released. The internal cells, of which each dispersed particle of diazoamino benzene is a source, expand fully within the body, and the desired article is attained, ready for use or for such further preparatory fabrication as may be desired.

The familiar vulcanizing mold is a two-part casting whose components meet in a plane; and, in the case of such a cylindrical article as that here in contemplation, on a plane that is axial with respect to the mold cavity. A difficulty that attends operation is that, when after vulcanization the mold is opened and the mold parts begin to separate, the contained elastic body under tremendous internal pressure expands into the space between the receding mold parts and, under conditions of quantity production, is liable to suffer laceration upon the edges of the mold parts, with rupture of the walls of the internal cells. It is in avoidance of such difficulty by the method herein described that this invention has been made.

The mold illustrated consists of and includes essentially a tube, advantageously a seamless tube of steel, with caps upon one and preferably upon both of its ends, and a ring, formed conveniently of seamless tubing of steel, of suitable length, adapted to be inserted into and to rest snugly within and to be removable from the tube first mentioned. The mold will ordinarily be a multiple mold, adapted to receive a plurality of blanks for simultaneous vulcanization, and, accordingly, the tube will be of relatively great length; a plurality of rings will be provided; and, additionally, disks, conveniently of steel, will be provided. The disks will be of circular outline, of a size to enter and to rest snugly within the tube, and, introduced into the tube alternately with the rings, to afford within the assembled mold partitions, defining at the ends the successive mold cavities.

Referring to the drawing, the outer tube is indicated at 1. It is a cylindrical shell of metal whose bore is sufficiently smooth. Advantageously, it may be a length of seamless steel tubing. The steel will, in its composition, be adequate to the use. As here shown, the tube may be understood to be 37 inches long; 2⅞ inches, outside diameter; and 2⅜ inches, inside diameter. These dimensions are given by way of example merely. They obviously may vary, in adaptation to the size of the articles to be produced and the number of articles to be produced in each run. And the engineer will understand that heating apparatus will be provided, such ordinarily as an open steam vulcanizer, adapted to receive the mold.

The caps 2 are removably borne by the tube at its two ends, and accordingly tube and cap may be screw-threaded for mutual engagement, as the drawing shows. The caps are advantageously made of like material with the tube itself. One of the caps at least, as is shown of the cap on the right, is penetrated by an orifice, and in the orifice a nipple 20 is set, for connection with a compressed air or gas line, or other fluid pressure source.

The rings 3 are of such length and of such internal diameter as to receive the uncured blank and to afford proper space confinement during vulcanization, and the rings are of such external diameter as to permit of snug but separable fit within the tube. The clearance, in case tube and ring alike are of steel, should be, approximately, 0.005 of an inch—that is to say, 0.01 on the diameter. With such allowance, each ring may be of an outside diameter of 2⅜ inches; of an inside diameter of 2 1/16 inches; and of a length of 2 5/16 inches.

The disks 4 are of metal, and conveniently of steel, cut from a plate and shaped. Each is, with clearance of the order given in the case of the rings, 2⅜ inches in diameter and from ⅜ to ½ an inch in thickness. The edges of the disks are advantageously rounded, on a radius approximately half that of the bore of the containing tube. By such provision the jamming of the disks in their movements within the tube is guarded against and prevented. The drawing shows the disks to be of bulging form and lenticular cross-section, and such refinement of shape is advantageous. The vulcanized article will be somewhat more readily responsive to expansion at the centre of its limiting end surfaces than at the margins; and in consequence of this bulged shape of the disks a shape is given to the still confined article F, and before vulcanization is completed, such as to afford compensation, and bring the expanded article to flat-ended shape, as seen in Fig. IV. On like account the rings 3 also might be so minutely shaped as to afford compensation for freer diametrical expansion midway the length than toward the ends of the finished article. Such refinement is not shown in the drawing, but it may be understood that the inner walls of the ring might be bowed inwardly to a somewhat smaller diameter on a mid-section than at the ends. Ordinarily, I find rings of uniform bore to be adequate.

Fig. I shows a mold composed of one tube, two caps, and a plurality of rings and disks. It may be understood that, in all, there are thirteen rings and fourteen disks. It will be remarked of this showing that a disk 4 is first introduced into the tube 1 from right to left (the left end being capped) and occupies a position at the extreme left end of the assembly. Rings 3 and disks 4 then succeed in alternate arrangement, until, at the right-hand end, a disk 40 of greater thickness completes the assembly. Upon it the cap 2 at the right immediately bears. This terminal disk 40 is formed of greater thickness as a matter of convenience. Upon it the cap 2 immediately bears; and the thickness of the disk is such as to afford compensation for small variations in dimensions, and to allow the screwing home of the cap to complete a snug assembly.

It will be understood of the charged and closed mold that the chambers within which the blanks are severally inclosed are not hermetically tight;

the parts are not so closely fitting. It will be understood that, as the blank expands in consequence of the development of gas within its substance, the surrounding air will be displaced and will escape; and that, even if the screw connections between tube and caps were air tight (as ordinarily they are not), the orifice through the cap on the right, in which the nipple 20 is set, would afford relief.

When the mold is to be used, the assembly is gradually effected, from left to right, and within each ring, before it is slipped to place, a blank or "biscuit" F to be vulcanized is inserted. The mold is charged with the blanks in green and unvulcanized condition, and at room temperature. When the mold has been filled and closed, it may be introduced into the open steam chamber of a vulcanizer or into another chamber, where it may be suitably heated. Vulcanization follows. After vulcanization the mold is ordinarily allowed to grow cold and to return to room temperature. The caps 2, one or both, are then removed. The aggregate pressure of the bubbles of compressed gas within the now vulcanized articles becomes effective to expand longitudinally within the tube the whole column of its contents. The end disks fall away and the end rings move outward. One or more of them may thus be released, depending upon the length of the tube and the number of articles within it. Removal of the rings and disks that remain may conveniently be effected by replacing (if it has already been removed) the cap 2 on the right, establishing connection through nipple 20 with a source of fluid pressure, and under fluid pressure stripping the contents from tube 1. The articles F are then severally pushed out from the confining rings 3. In such opening of the mold and release of the vulcanized articles the expansion of the now fully vulcanized articles is completed. This expansion occurs freely, and there is no laceration of rubber surfaces. The expansion of the vulcanized article is a two-step expansion. Pressure is at a maximum when first the caps 2 are removed; the expansion then is greatest over the central areas of the ends of the cylindrical bodies; and there is no damaging due to dragging of rubber surfaces over steel edges. When eventually the articles are separated from the rings, they are already so far expanded that no injury occurs. It is in this two-step release of the article from the mold that novelty in method is found. Referring to Fig. III, the limiting surfaces of the article, when vulcanization has been completed and before the opening of the mold has been begun, are indicated by the dotted lines $a, a$. The full-line showing of the article is illustrative of its position within the ring after confinement at the ends has been relieved and after the first step of expansion of the cells and the elongation of the article has occurred. The article then is confined circumferentially only by the ring 3 that forms the side walls of the mold.

Obviously the ring might be a split ring; for the expansion that is indicated in Fig. III might be accomplished more or less completely while the ring 3 continued in place within the tube 1; but obviously also a ring of integrity and continuity is better, since by its removal from the tube the first step of longitudinal expansion may be freely and completely accomplished before release of the article from the ring is begun.

The finished article in preferred form, as diagrammatically shown in Fig. IV, consists of a cellular rubber body F encased in an envelope $f$ of dense rubber. The whole is, in consequence of expansion, larger than the mold chamber in which it was vulcanized. As has been said, the envelope $f$ may be lacking.

In the foregoing description of actual procedure I have assumed the method of cell production to be the blowing method. As already intimated, the invention permits the practice of the gassing method. If the gassing method be employed, the union of the caps 2 upon the ends of the tube 1 will be made hermetically tight for high-pressure operation; while the nipple 20 in one of the caps affords connection through which air may first be evacuated, and then a suitable gas may be introduced and pressure may be built up. The apparatus will of course in such case be made strong to endure the conditions of operation.

While a multiple chamber mold is contemplated and shown and described, it is manifest that the length of the tube 1 may be so far reduced as to receive but a single ring 3; and, further, that in such case the caps 2 themselves may constitute the sole closure upon the ends of the ring. Indeed, in any case, the caps may constitute the closures upon the outer ends of the ring assembly. I prefer, however, that disks be interposed, as the drawings show, between the end rings and the caps, to form the outermost ring closures.

The invention has been described as applicable to the production of a cylindrical article. Manifestly, the inner mold members, the rings and the disks, may be so shaped as to afford articles departing more or less widely from the typical cylindrical shape. The only limitation here is that elaboration of shape shall not be such as to forbid the ultimate safe removal of the article from the mold.

In the the foregoing specification I have referred to the gassing and blowing methods of imparting cellular structure to a body of rubber, and for simplicity of definition in certain of the appended claims I shall use the term gassing as comprehensive of either method.

Within the terms of the appended claims several modifications and variations are permissible without departing from the spirit of the invention.

I claim as my invention:

1. The method of simultaneously forming a plurality of cellular vulcanized rubber bodies of general cylindrical shape which comprises charging green rubber into a succession of laterally secured, axially expansible mold matrices whose end walls are initially confined against axial expansion, gassing and vulcanizing the rubber while so confined, thereafter expanding the rubber in an axial direction while restraining it against expansion in a radial direction in the matrices, and the removing the bodies from the matrices.

2. The method of simultaneously forming a plurality of cellular vulcanized rubber bodies which comprises charging green rubber into a succession of laterally secured, axially expansible mold matrices and initially confining the end walls of the matrices against axial expansion, gassing and vulcanizing the rubber while so confined, thereafter expanding the rubber in an axial direction while restraining it against expansion in a radial direction in the matrices, and then removing the bodies from the matrices.

WALTER E. HUMPHREY.